(12) United States Patent
Ito

(10) Patent No.: US 8,699,052 B2
(45) Date of Patent: Apr. 15, 2014

(54) IMAGE FORMING APPARATUS, CONTROL METHOD, AND PROGRAM

(75) Inventor: Fumitoshi Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 443 days.

(21) Appl. No.: 13/039,480

(22) Filed: Mar. 3, 2011

(65) Prior Publication Data

US 2011/0222102 A1   Sep. 15, 2011

(30) Foreign Application Priority Data

Mar. 12, 2010   (JP) ................................ 2010-055997

(51) Int. Cl.
*G06K 15/00* (2006.01)
*G06F 21/00* (2013.01)

(52) U.S. Cl.
USPC ......................................... 358/1.14; 713/185

(58) Field of Classification Search
USPC ......................................... 358/1.14; 713/185
See application file for complete search history.

(56) References Cited

U.S. PATENT DOCUMENTS

2004/0187009 A1 *   9/2004   Ebata ............................ 713/185

FOREIGN PATENT DOCUMENTS

JP   2008-158695 A   7/2008

* cited by examiner

*Primary Examiner* — Douglas Tran
*Assistant Examiner* — Justin Katzwhite
(74) *Attorney, Agent, or Firm* — Canon USA, Inc., IP Division

(57) ABSTRACT

An image forming apparatus including a web server configured to generate an operation screen and a browser configured to receive the operation screen from the web server and to display the operation screen includes an identification unit configured to identify, if a connection request is given to the web server, a requestor of the connection request, a web server authentication unit configured to perform authentication of a user to use the web server, and a control unit configured to, if the requestor is identified as the browser of the image forming apparatus by the identification unit, control the web server to transmit the operation screen to the browser of the image forming apparatus without the web server authentication unit performing the authentication.

6 Claims, 9 Drawing Sheets

IMAGE FORMING APPARATUS, CONTROL METHOD, AND PROGRAM

BACKGROUND OF THE INVENTION

1. Field of the Invention

The present invention relates to an image forming apparatus which can use a service provided by an external server, a control method, and a program.

2. Description of the Related Art

Conventionally, it is known that an image forming apparatus (e.g., a multifunction peripheral (MFP)) can use a service provided by an external server when the external server and the image forming apparatus communicate via the Internet.

Japanese Patent Application Laid-Open No. 2008-158695 discusses a method useful for an apparatus including a web server function. According to this method, the apparatus generates a screen by combining information obtained by using a function of an external server and information in the apparatus, and displays the generated screen by a web browser included in the apparatus.

SUMMARY OF THE INVENTION

According to an aspect of the present invention, an image forming apparatus including a web server configured to generate an operation screen and a browser configured to receive the operation screen from the web server and to display the operation screen includes an identification unit configured to identify, if a connection request is given to the web server, a requestor of the connection request, a web server authentication unit configured to perform authentication of a user to use the web server, and a control unit configured to, if the requestor is identified as the browser of the image forming apparatus by the identification unit, control the web server to transmit the operation screen to the browser of the image forming apparatus without the web server authentication unit performing the authentication.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

If a user uses an image forming apparatus including a web browser as well as a web server, the apparatus may cause inconvenience to the user when user authentication which is performed when the web browser is connected to the web server is performed.

Before a web browser is connected to a web server, in some cases, authentication of the user operating the web browser is performed. According to this authentication, access to the web server by a user who is not permitted is avoided. If the authentication is successful, the web server transmits certain information (e.g., screen information) to the web browser.

Regarding such an image forming apparatus including a web browser and a web server, authentication is performed even if the connection is requested from the web browser in the same image forming apparatus. This authentication is inconvenient for the user. This is because the user needs to pass the authentication although the possibility of the connection being unauthorized will be low if the connection is requested from a web browser in the same image forming apparatus. As a result, the user needs to repeat unnecessary user authentication operation.

Further, if the image forming apparatus includes an authentication function which is used when the user logs into the image forming apparatus in using a scanner or a printer included in the image forming apparatus, the possibility of the user requesting the connection from the web browser in the same image forming apparatus being an unauthorized user will be furthermore decreased.

If the image forming apparatus includes such an authentication function, the user needs to pass the authentication necessary in using the scanner or the printer function of the image forming apparatus as well as the authentication required for the connection to the web server. Since the two types of authentication are performed by the same image forming apparatus, the possibility of the user who has passed the authentication in using the image forming apparatus and the user who has received the operation screen from the web server by using the web browser being the same user will be high. Although the possibility is high, however, the user needs to enter the authentication information two times. If the authentication information used for the two types of authentication is different, it means that the user needs to manage two pieces of authentication information and it will be furthermore inconvenient for the user.

Thus, the present invention is directed to a method useful for a user in reducing time and effort necessary in the authentication processing with respect to an apparatus that receives an operation screen from a local web server and displays the received operation screen using a web browser.

Figure 1:
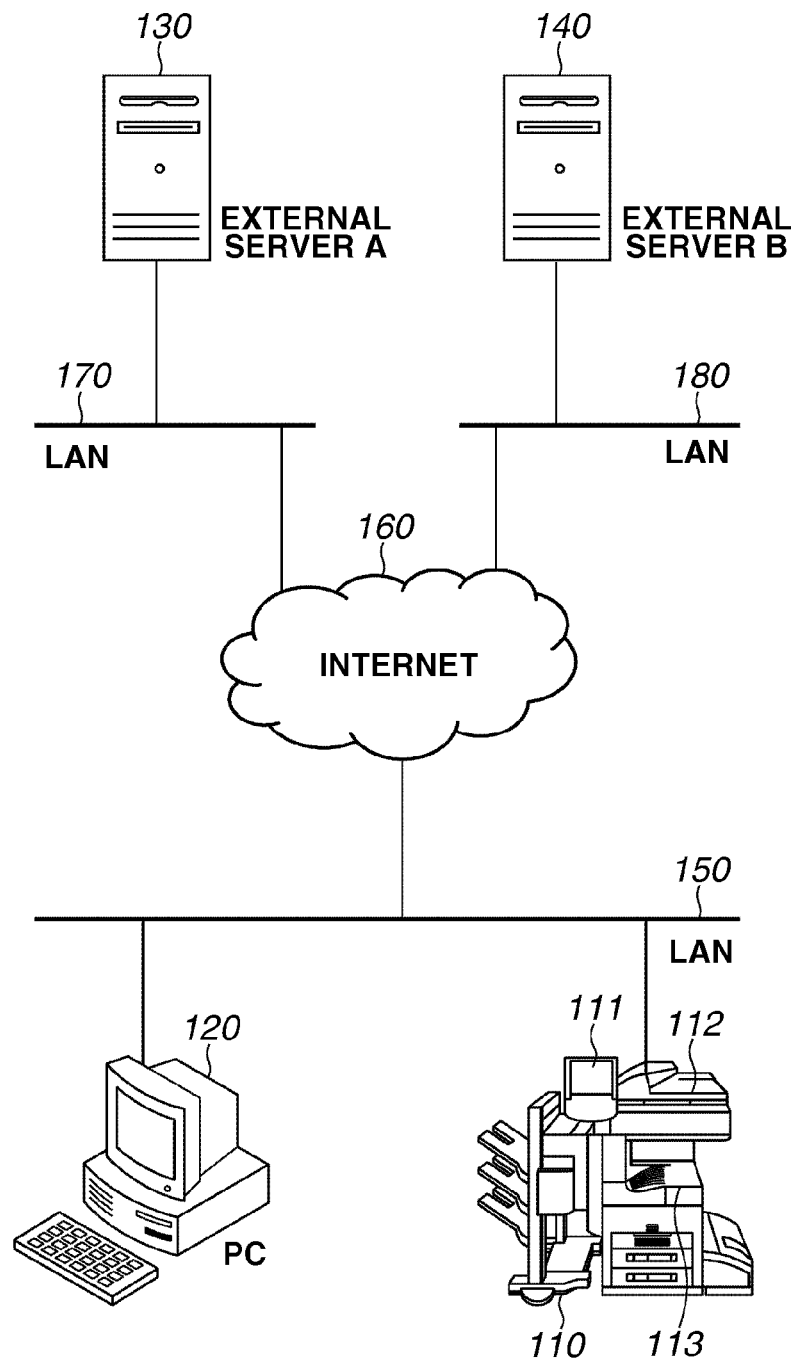
FIG. 1 is an overall view of an image processing system according to a first exemplary embodiment of the present invention.

FIG. 1 illustrates an image processing system according to a first exemplary embodiment of the present invention. An MFP 110 and a PC 120 are respectively connected to the Internet 160 via a local area network (LAN) 150 and are capable of communicating with each other. The PC 120 is used by an administrator of the MFP 110 according to the first exemplary embodiment and used for remote management of software in the MFP 110. In the following description, the MFP 110 is given as an example of the image forming apparatus.

Further, an external server A 130 that provides a file management service described below is connected to the Internet 160 via a LAN 170. Similarly, an external server B 140 that provides a different file management service is connected to the Internet 160 via a LAN 180. Thus, the MFP 110 can communicate with the external server A 130 and the external server B 140 and use the file management services provided by both servers.

In the following description, the external server A 130 alone provides the file management service. However, as a different configuration of the external server A 130, the external server A can include a plurality of servers so that a plurality of virtual machines in the group of servers operate and perform distributed processing. In this case, a technique called scale out used in increasing the number of virtual machines (cloud computing) according to a predetermined condition is used. The same applies to the external server B 140.

Figure 2:
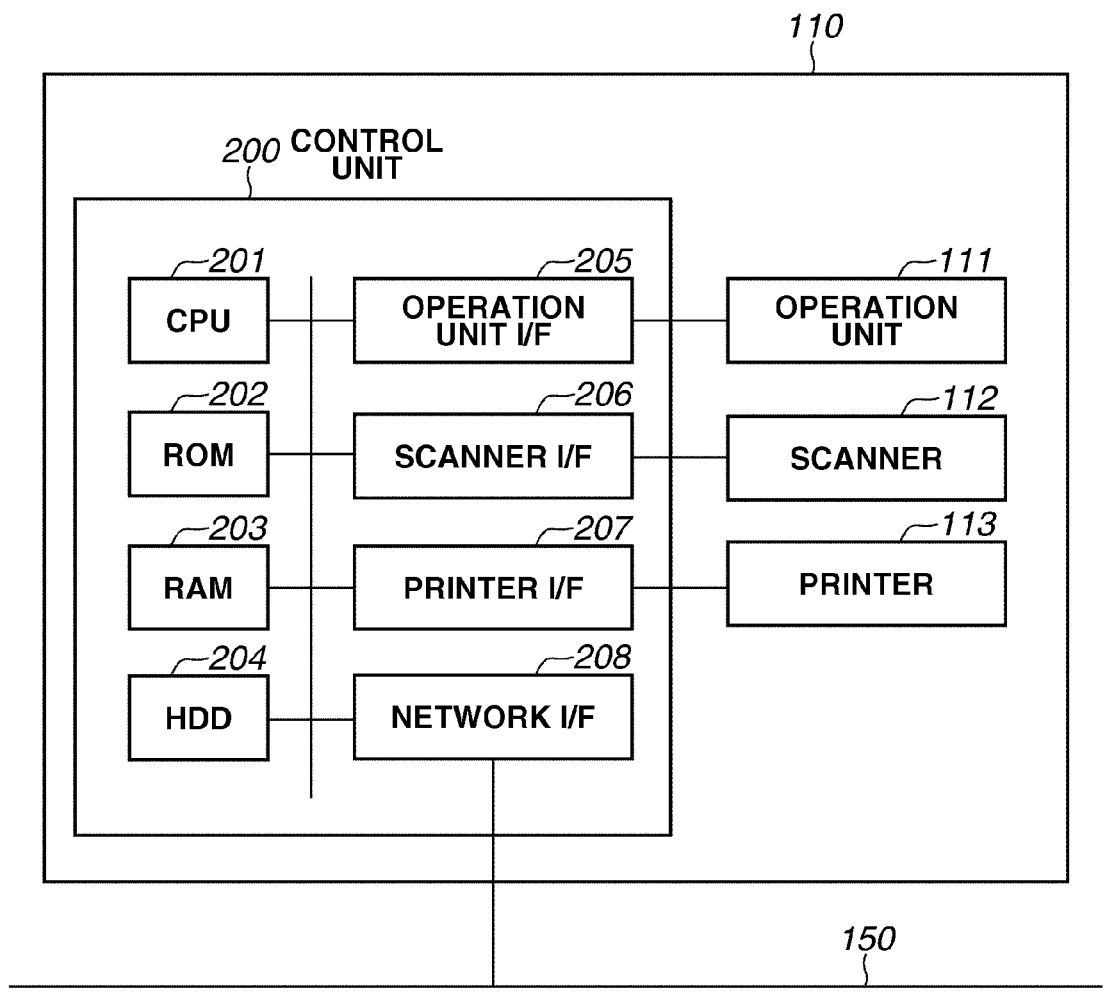
FIG. 2 is a block diagram illustrating a hardware configuration of an MFP according to the first exemplary embodiment.

FIG. 2 is a block diagram illustrating a hardware configuration of the MFP 110. As illustrated in FIG. 2, the MFP 110 includes a scanner 112 being an image input device, a printer 113 being an image output device, a control unit 200 which controls the MFP 110, and an operation unit 111.

The control unit 200, which includes a CPU 201, controls the entire operation of the MFP 110. The CPU 201 reads out a control program stored in a ROM 202 or an HDD 204 and performs various control operations such as scan control and transmission control. A RAM 203 is used as a main memory and a temporary storage area such as a work area of the CPU 201.

The HDD 204 stores image data and an operating system as well as various application programs. Software described below is stored in the HDD 204. The CPU 201 loads the software into the RAM 203 and executes it.

An operation unit I/F 205 connects the operation unit 111 and the control unit 200. The operation unit 111 includes a liquid crystal display unit having a touch panel function and a keyboard. A printer I/F 207 connects the printer 113 and the control unit 200. Image data to be printed by the printer 113 is transferred from the control unit 200 to the printer 113 via the printer I/F 207 and printed on a recording medium.

A scanner I/F 206 connects the scanner 112 and the control unit 200. The scanner 112 scans an image of a document, generates image data, and inputs the generated image data in the control unit 200 via the scanner I/F 206. A network I/F 208 connects the control unit 200 (the MFP 110) and the LAN 150. The network I/F 208 is used when image data or various types of information is transmitted from the MFP 110 to the external server A 130 via the LAN 150 or receiving image data or various types of information from the external server A 130 via the LAN 150. Communication with the external server B 140 is controlled in a similar manner.

Figure 3:
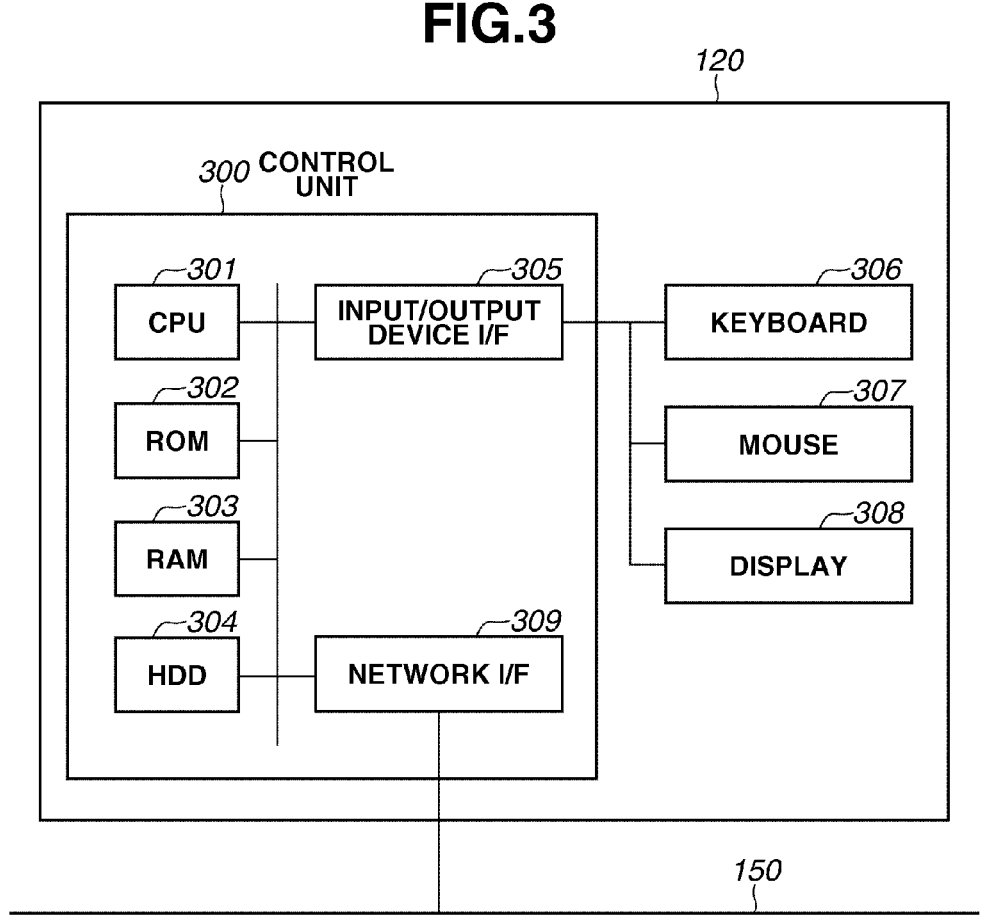
FIG. 3 is a block diagram illustrating a hardware configuration of a personal computer (PC) according to the first exemplary embodiment.

FIG. 3 is a block diagram illustrating a hardware configuration of the PC 120. A control unit 300 including a CPU 301 controls the operation of the entire PC 120. The CPU 301 reads out a control program stored in a ROM 302 or an HDD 304 and executes various type of control processing. A RAM 303 is used as a main memory and a temporary storage area such as a work area of the CPU 301. The HDD 304 stores the operating system and various programs.

An input/output device I/F 305 connects a keyboard 306, a mouse 307, and a display 308 and the control unit 300. A network I/F 309 connects the control unit 300 (the PC 120) and the LAN 150. The network I/F 309 controls data communication between the MFP 110, the external server A 130, and the external server B 140 via the LAN 150. Since the configurations of the external server A 130 and the external server B 140 are similar to the configuration of the PC 120, their descriptions are not repeated.

Figure 4:
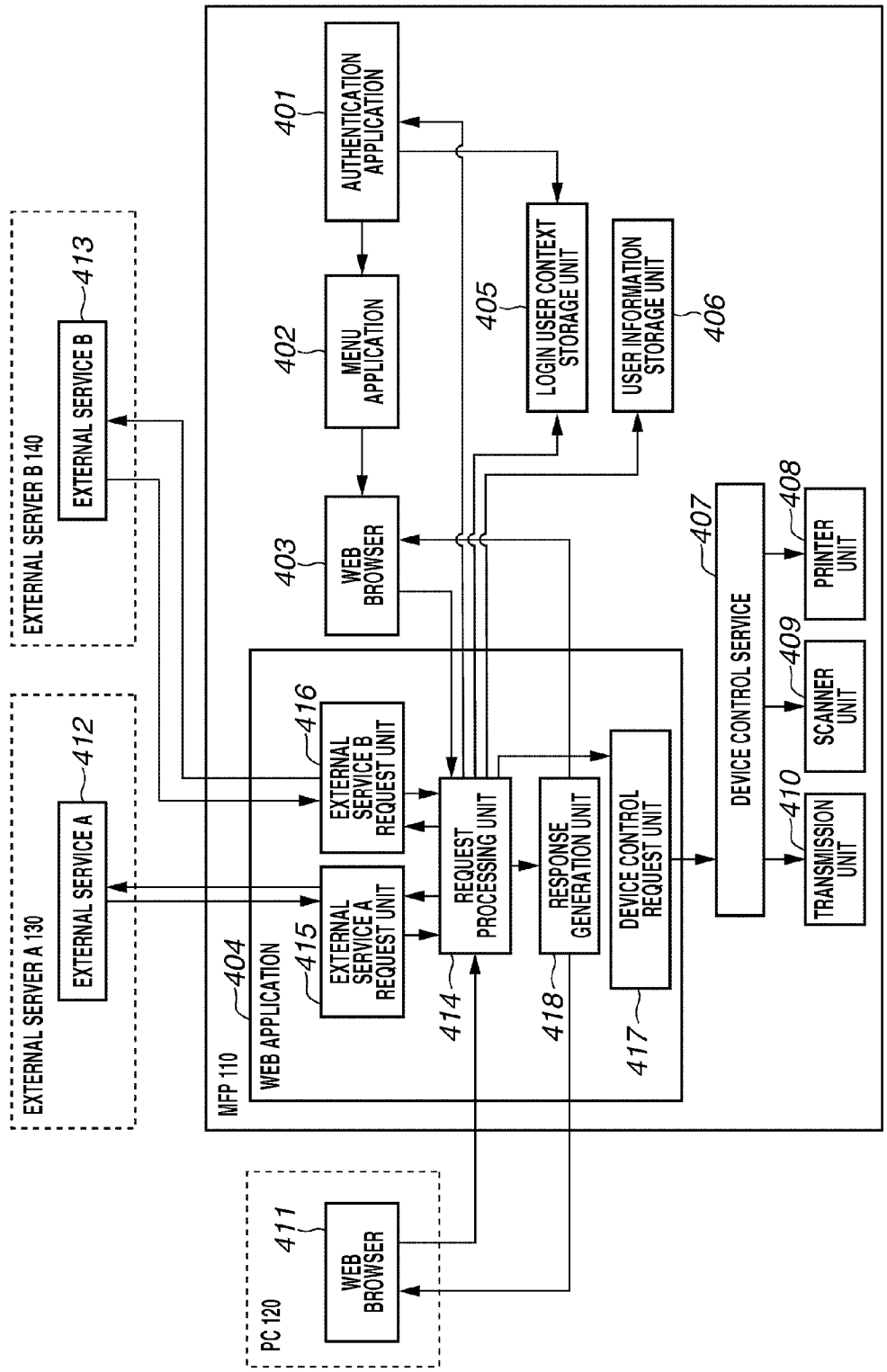
FIG. 4 is a block diagram illustrating a software configuration of the image processing system according to the first exemplary embodiment.

Next, the image processing system according to the first exemplary embodiment will be described with reference to FIG. 4. FIG. 4 is a block diagram illustrating a configuration of the entire image processing system illustrated in FIG. 1. Each unit in FIG. 4 is realized by each CPU in the MFP 110, the PC 120, the external server A 130, and the external server B 140 executing various application programs.

The MFP 110 includes an authentication application 401, a menu application 402, a web browser 403, and a web application 404. Further, the MFP 110 includes a login user context storage unit 405, a user information storage unit 406, a device control service 407, a printer unit 408, a scanner unit 409, and a transmission unit 410.

The authentication application 401 includes a function that allows authentication of the user that operates the MFP 110. The authentication application 401 displays a user interface (UI) for authentication on the operation unit 111 and accepts a login instruction given by user.

The menu application 402 displays a list of functions of the MFP 110 on the operation unit 111 so that the user can select a function. Further, the menu application 402 invokes the function selected by the user.

The web browser 403 communicates with the web application 404 by using the Hypertext Transfer Protocol (HTTP). More specifically, a request for HyperText Markup Language (HTML) data displayed on the operation screen by the web browser 403 is given to the web application 404 according to an HTTP GET command. In response to the request, the web browser 403 receives a response message from the web application 404. Then, the web browser 403 analyzes the response message received from the web application 404. HTML data or image data is included in the response message. The web browser 403 analyzes the response message and displays the result on the operation unit 111. Further, according to an input operation performed by the user using the operation screen displayed on the operation unit 111, the web browser 403 notifies the web application 404 of the operation information including the content of the operation performed by the user by using an HTTP POST command.

The web application 404 includes a request processing unit 414, an external service A request unit 415, an external service B request unit 416, a device control request unit 417, and a response generation unit 418. Although detailed descriptions are given below, the web application 404 functions as a web server when it communicates with the web browser and functions as a client when it communicates with the external server A 130 and the external server B 140. This is because the web application 404 includes a function that allows response to a request sent from the web browser 403 as well as a function that allows transmission of a request to the external server A 130 and the external server B 140.

The request processing unit 414 analyzes the request from the web browser 403 or a web browser 411 of the PC 120 and invokes the external service A request unit 415, the external service B request unit 416, or the device control request unit 417 as needed. Further, the request processing unit 414 forwards the result obtained from the external service A request unit 415 or the external service B request unit 416 (information related to the service provided by the external server A 130 or the external server B 140) to the response generation unit 418. Furthermore, the request processing unit 414 identifies the web browser being the requestor (requestor of the connection), determines the content of the request sent from the web browser 403 or 411, and instructs the response generation unit 418 to generate a screen. This processing is described below.

In using the external service A 412, the external service A request unit 415 transmits a request message to an external service A 412 as well as receive a response message transmitted from the external service A 412. The response message includes information related to the service provided by the external service A 412. The external service A request unit 415 performs communication by using a communication protocol offered by the external service A 412.

As is with the external service A 412, the external service B request unit 416 transmits a request message to an external service B 413 and receives a response message.

According to a job control instruction transmitted from the request processing unit 414, the device control request unit 417 transmits a request to the device control service 407. This request is for controlling the device control service 407. Further, the device control request unit 417 receives a response from the device control service 407 and acquires a state of the device or a state of the job.

The response generation unit 418 generates operation screen information in HTML format based on a response from the external service A request unit 415 or the external service B request unit 416 and transmits the HTML data to the web browser being the requestor as a response message. According to the first exemplary embodiment, the response to the external service A request unit 415 or the external service B request unit 416 is an XML document.

The login user context storage unit 405 stores context information of the user who has logged into the MFP 110. Login context according to the first exemplary embodiment includes a user identifier and authority information. Further, there are two types of login context according to the first exemplary embodiment. The first login context is local login context. This login context is of a user who has logged into the MFP 110 via the web browser 403 displayed on the operation unit 111. The second login context is remote login context. This login context is related to session information of the web application 404 and the web browser 411. The remote login context is generated for each session. The session is determined according to an identifier included in cookie information transmitted from the web browser. The generation of the login context will be described below.

The user information storage unit 406 is a software module that manages information of each login user. The user information storage unit 406 records an ID and a password used for access to the external service A 412 or the external service B 413 for each user. According to the first exemplary embodiment, the user uses a different ID and password for the access to the external service A 412 and to the external service B 413. However, the same ID and password may also be used.

The device control service 407 is software that accepts a request regarding a job instruction such as a print job or a scan job, invokes a control module of the printer unit 408, the scanner unit 409, or the transmission unit 410 illustrated in FIG. 4, and executes the job. Further, the device control service 407 determines the state of each control module and notifies the device control request unit 417 of the state of the control module.

The printer unit 408 is a software module that accepts a print instruction and acquires image data in the HDD 204 via the printer I/F 207 so that the image data can be printed by the printer 113. The scanner unit 409 is a software module that accepts a scan instruction so that the scanner 112 performs scanning via the scanner I/F 206. The scanned and generated image data is stored in the HDD 204. The transmission unit 410 is a software module that accepts a transmission instruction given by the user and transmits the image data in the HDD 204 to a location designated by the user via the network I/F 208.

The PC 120 includes the web browser 411. The web browser 411 communicates with the web application 404 according to the HTTP protocol. Further, the web browser 411 displays an operation screen obtained by the communication on the display 308 via the input/output device I/F 305. The above-described obtained operation screen according to the first exemplary embodiment is a screen used for configuring the setting information necessary in connecting the MFP 110 to the external server A 130 or the external server B 140. By operating the operation panel, the web application 404 can be set by an apparatus at a remote site. Display processing of the operation screen used for setting the setting information will be described below.

The external server A 130 is an apparatus that provides a service and includes the external service A 412. The external service A 412 provides a file management service, analyzes a request message which has been received, and performs file processing according to the result of the analysis. In other words, the external service A 412 performs uploading and downloading of files as well as searching and deleting of files. According to the first exemplary embodiment, the external service A 412 includes an interface for a web service and is controlled by an SOAP message. Further, the response message received by the external service A request unit 415 described above includes information related to file processing (e.g., information of an uploaded file, information of a file location).

The external server B 140 is an apparatus that provides a service and includes the external service B 413. As is with the external service A 412, the external service B 413 provides a file management service. However, its interface of the web service is different. The external service B 413 is controlled by ATOM.

Next, display processing of a file list managed by the external service A performed by the user operating the MFP 110 will be described with reference to FIG. 5. How the web application 404 identifies a user will also be described.

Figure 5:
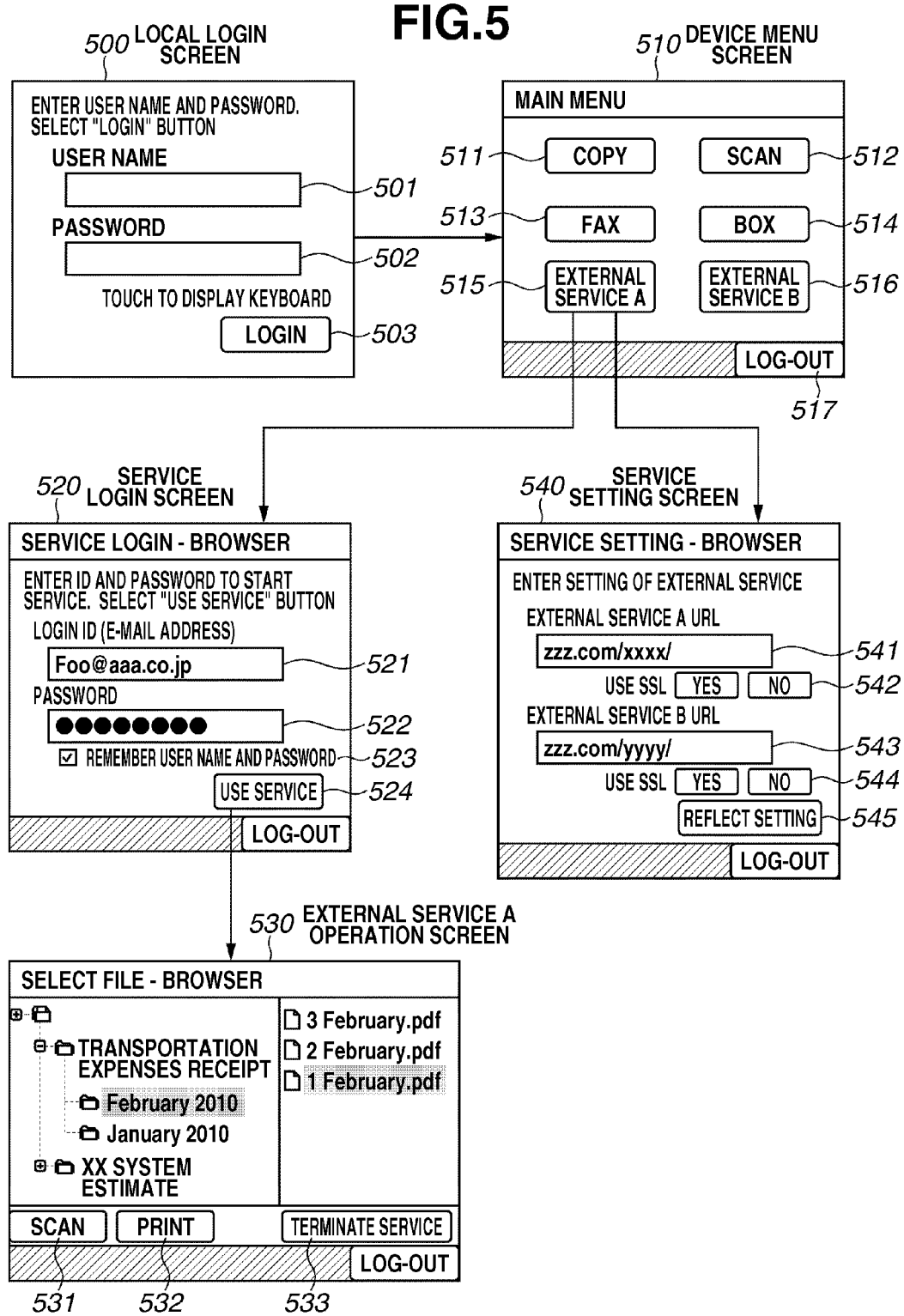
FIG. 5 illustrates the transition of an operation screen displayed by a web browser according to the first exemplary embodiment.

FIG. 5 illustrates operation screens displayed on the operation unit 111 of the MFP 110. Each operation screen of the MFP 110 illustrated in FIG. 5 is operated by the user. Description of each screen will be given below. Transition from one screen to another will be described with reference to the sequence diagram below.

A local login screen 500 is a screen which the user of the MFP 110 uses for the authentication. This screen is displayed according to the authentication application 401. When the user inputs authentication information in a user name input text box 501 and a password input text box 502 and then selects a login button 503, the authentication application 401 compares the input information with the user list stored in advance and performs user authentication. Authentication information of the user of the MFP 110 is included in the user list. If the authentication is successful, the user who has passed the authentication can use the functions of the MFP 110. According to the first exemplary embodiment, this authentication is called user authentication.

A device menu screen 510 is a menu screen which the user uses in selecting the function to be executed by the device. This screen is displayed according to the menu application 402. The menu includes a copy button 511 used for starting a copy application and a scan button 512 used for starting a scan application. Additionally, the menu includes a facsimile button 513 used for starting a facsimile transmission application and a box button 514 used for starting an application used for managing the images stored in the HDD 204. According to the first exemplary embodiment, the menu further includes an external service A button 515, which the user selects when the user uses the external service A 412, and an external service B button 516, which the user selects when the user uses the external service B 413. These services are used by starting the web browser 403. Further, a log-out button 517, which the user selects when the user terminates the use of the MFP 110 and returns to the local login screen 500, is provided. The log-out buttons in a service login screen 520, an external service A operation screen 530, and a service setting screen 540 are the same GUI button as the log-out button 517.

The service login screen 520 is a screen used when authentication for the external service A 412 is performed. This screen is displayed when the web browser 403 sends out an operation screen acquisition request to the web application 404. When the user inputs the ID and the password in a login ID text box 521 and a password input text box 522 and selects a use service button 524, authentication for the external service A 412 is performed. Further, a check box 523 is a box which the user checks when the user desires to store the login ID and the password in the web application 404.

The external service A operation screen 530 is displayed when the web browser 403 sends out an acquisition request for the operation screen to the web application 404. The web application 404 acquires information related to the service provided by the external service A 412, which is an XML document according to the first exemplary embodiment, and generates the screen based on the acquired information. A scan button 531 is a button which the user selects when the user performs scanning. When the user selects the scan button 531, the scanned image is stored in a currently selected folder. More specifically, the request processing unit 414 receives the event (selection of the scan button 531), and instructs the device control request unit 417 to give an instruction for scanning. The device control request unit 417 submits the job to the scanner unit 409 and the transmission unit 410 via the device control service 407. Then, paper scanning and transmission of the scanned image is performed.

A print button 532 is used for printing the currently selected file. When the user selects the print button 532, the currently selected file is printed. More specifically, when the request processing unit 414 receives an event related to the selection of the print button 532, the request processing unit 414 receives a file selected on the external service A operation screen 530 from the external service A 412 via the external service A request unit 415, and stores the file in the HDD 204. Then, the device control request unit 417 submits a print job of the stored file to the printer unit 408 via the device control service 407. A terminate service button 533 is used for terminating the connection to external service A 412 and returning to the service login screen 520.

The service setting screen 540 is used for making setting necessary in connecting the web application 404 to the external service A 412 or the external service B 413. As setting for the connection to the external service A 412, a text box 541 in which a Uniform Resource Locator (URL) of the external service A 412 is input and toggle buttons 542 used for determining whether to use SSL or not are provided on the screen. Similarly, a text box 543 and toggle buttons 544 are provided for the external service B 413. When the setting is configured, the web application 404 sends out an instruction so that the setting is stored. A setting reflection button 545 accepts such an instruction given by the web application 404.

Figure 6:
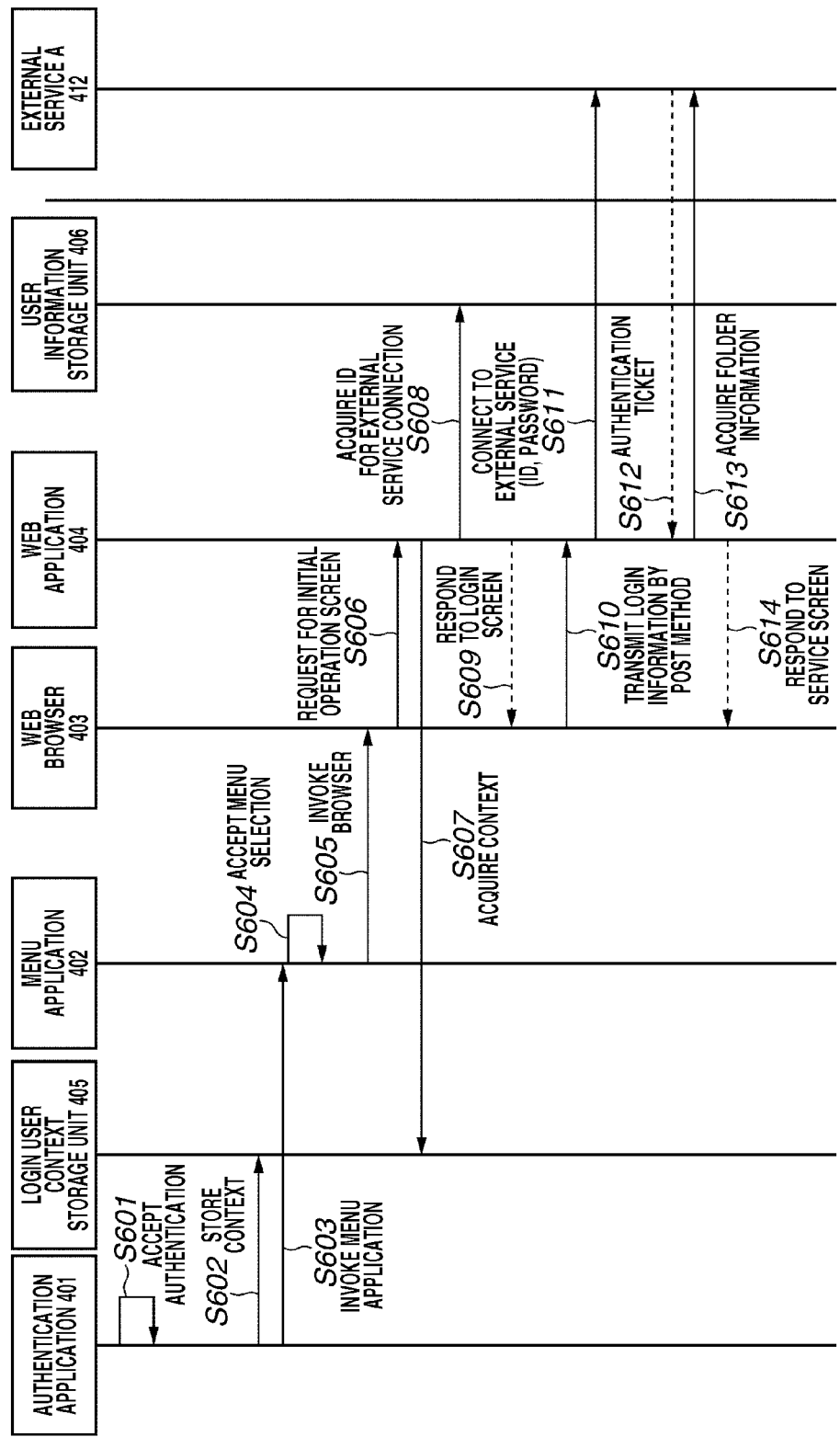
FIG. 6 is a sequence diagram of the image processing system illustrating processing by the MFP performed until an operation screen of an external service A is displayed according to the first exemplary embodiment.

Next, processing performed when the user uses the external service A 412 from the MFP 110 will be described with reference to FIG. 6. FIG. 6 is a sequence diagram from when the local login screen 500 is displayed to when the external service A operation screen 530 is displayed.

In step S601, the authentication application 401 displays the local login screen 500 and then accepts a login instruction given by the user. The authentication application 401 performs the authentication when it accepts the user name and the password.

Step S602 is executed when the authentication in step S601 is successful. In step S602, the authentication application 401 generates login context and stores the generated login context in the login user context storage unit 405 as information of the local login user. The login context generated in step S602 is local login context.

In step S603, the authentication application 401 invokes the menu application 402. When the menu application 402 is invoked, the device menu screen 510 is displayed on the operation unit 111.

In step S604, the menu application 402 accepts the function selected by the user. According to the first exemplary embodiment, the following processing is performed based on the assumption that the external service A button 515 has been selected by the user.

In step S605, the menu application 402 invokes the web browser 403. At this time, a URL set in advance for the menu button (the external service A button 515) is sent to the web browser 403. According to the first exemplary embodiment, a URL used by the web application 404 in using the external service A 412 is designated.

In step S606, based on the URL received in step S605, the web browser 403 sends out an acquisition request for information related to the service. According to the first exemplary embodiment, since the server portion of the URL indicates the web application 404, the web browser 403 sends out an acquisition request for an operation screen to the web application 404. On receiving the acquisition request for an operation screen from the web browser 403, the web application 404 generates an operation screen.

Figure 7:
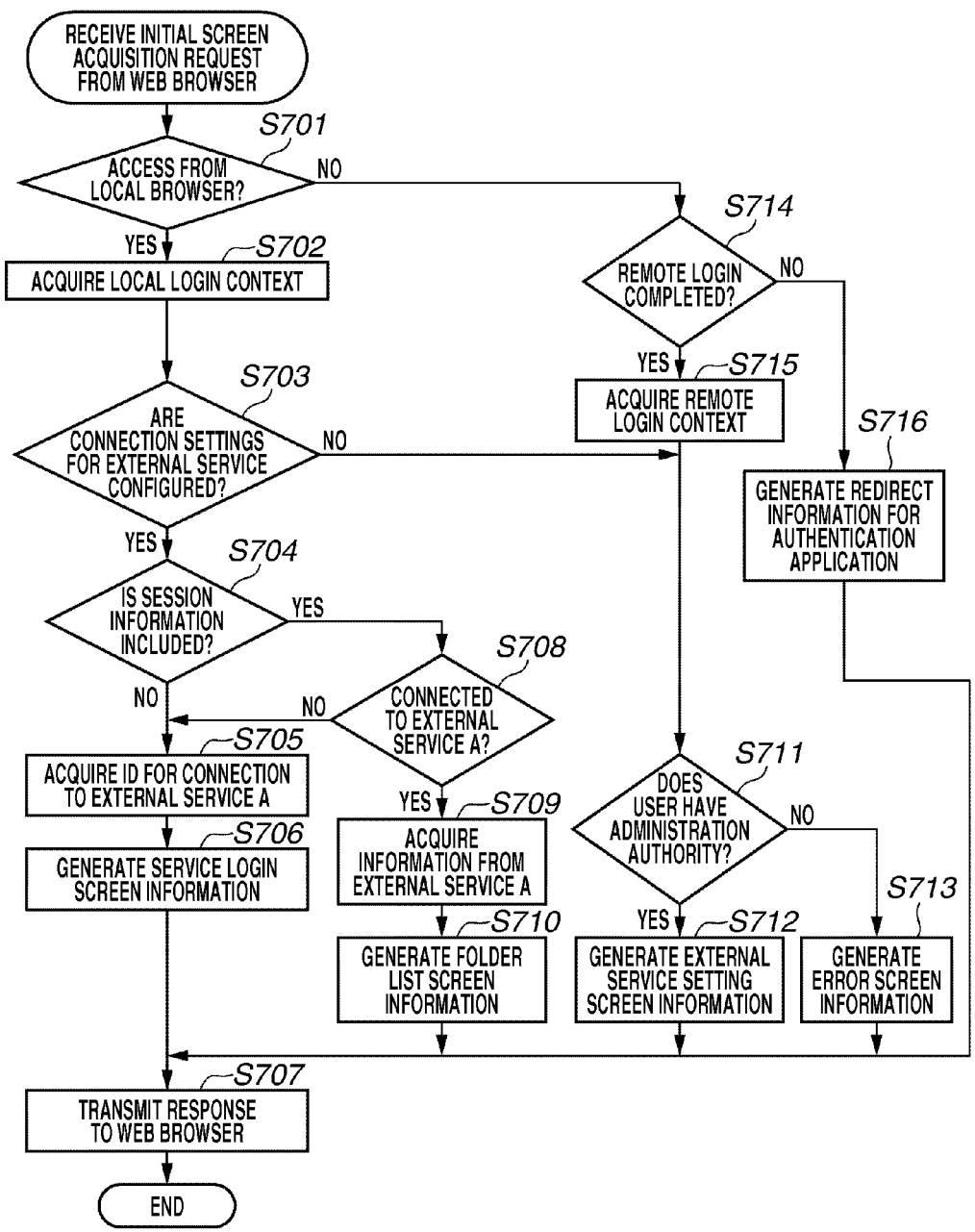
FIG. 7 is a flowchart illustrating processing of a screen acquisition request executed by a web application according to the first exemplary embodiment.

The processing performed by the web application 404 at that time will be described with reference to FIG. 7. FIG. 7 is a flowchart illustrating processing performed by the web application 404 in response to the acquisition request for the operation screen sent from the web browser 403 or the web browser 411.

In step S701, the web application 404 identifies the requestor of the connection to the web application 404. More specifically, the web application 404 determines whether the web browser being the requestor is a client in the same MFP 110. The determination processing will be described below in detail.

The web application 404 acquires the IP address of the client that has requested for the connection to an available network port of the web application 404. If the IP address is a local loopback address, the web application 404 determines that access is requested from a web browser in the same MFP 110. For example, if the address of the web browser is IPv4, then "127.0.0.1" is determined as the local loopback. Further, if the address of the web browser is IPv6, then "::1" is determined as the local loopback. If the web application 404 is accessed by the web browser using local loopback, in other words, if the web application 404 determines that it is accessed by the web browser 403 (YES in step S701), then the processing proceeds to step S702. If the web application 404 determines that it is accessed by a web browser other than the web browser 403 (NO in step S701), the processing proceeds to step S714.

According to the first exemplary embodiment, whether the web browser is in the same apparatus is determined based on whether the IP address is a local loopback address. However, a different method can also be used. For example, authentication of the web browser may be performed according to a certificate provided for the web browser 403 and the web application 404. According to the first exemplary embodiment, information used for determining whether the web browser is local or not (e.g., IP address, certificate) is called identification information.

The processing proceeds to step S702 only when the web application 404 is accessed from the web browser 403, and in step S702, the web application 404 acquires the local login context of the user who has logged into the MFP 110 from the login user context storage unit 405. According to this processing, the web application 404 makes such control that the user authentication which is required when the web browser 403 receives an operation screen from the web application 404 is not performed. This control is performed since the requestor that has requested for the connection to the web application 404 exists in the same MFP 110 and thus the possibility of the access being unauthorized access will be low. Further, the user using the MFP 110 is regarded as the user of this access session. This is because the person using the web browser 403 being the local browser can be determined as the user having logged into the MFP 110.

In step S703, the web application 404 determines whether a connection setting for the connection to the external service A 412 is configured in the web application 404. If the connection setting is not configured yet (NO in step S703), the processing proceeds to step S711. If the connection setting is configured (YES in step S703), the processing proceeds to step S704.

In step S704, the web application 404 determines whether session information is included in the request information sent from the web browser 403. More specifically, the web application 404 determines whether cookie information indicating the session is included in the request, and further, if the cookie information is included, whether the session identified by the cookie information is not closed and thus effective. If the session information is effective (YES in step S704), the processing proceeds to step S708. If the session information is not effective (NO in step S704), the web application 404 determines that the web application 404 is not connected to the external service A 412, and the processing proceeds to step S705.

In step S705, the web application 404 acquires the ID and the password used for the connection to the external service A 412. Based on the user context acquired in step S702, the request processing unit 414 requests the user information storage unit 406 for the ID and the password used for the connection to the external service A 412, which are stored in the user information storage unit 406 as they have been previously input by the user. The user information storage unit 406 identifies the information such as the ID and the password of the user used in the connection to the external service A 412. If the ID and the password are not stored in the user information storage unit 406 (the user accesses the external service A 412 for the first time), the ID and the password are null character strings.

In step S706, the response generation unit 418 generates HTML data for the service login screen 520 based on the ID and the password acquired in step S705.

In step S707, the response generation unit 418 transmits the HTML data which has been generated as a response to the web browser being the requestor. If the processing in step S706 or step S710 described below is executed, the response is transmitted to the web browser 403. When the response is transmitted to the web browser 403, it is transmitted in such a controlled state that authentication required in using the web application 404 is not performed. Further, if the processing in step S712 or S713 described below is executed, the response is transmitted to the web browser 411. The response is transmitted on condition that the authentication necessary in using the web application 404 is successful.

The processing in step S708 is performed when the session information of the web application 404 and the web browser 403 is determined as effective in step S704. In step S708, the web application 404 determines whether the session information between the external service A 412 and the web application 404 is effective. If the session information is determined to be effective (YES in step S708), the processing proceeds to step S709. If the session information is determined not to be effective (NO in step S708), the processing proceeds to step S705, and the web application 404 generates the screen used for the logging.

In step S709, the web application 404 requests the external service A 412 for a folder list so that it can obtain information necessary in generating the external service A operation screen 530. In other words, the service request processing unit 414 of the web application 404 receives information related to the service from the external service A 412 via the external service A request unit 415.

In step S710, based on the information received from the external service A 412 in step S709, the web application 404 generates HTML data of the external service A operation screen 530. Then, the processing proceeds to step S707, and the web application 404 transmits the generated screen data of the external service A operation screen 530 to the web browser 403.

In step S711, the web application 404 checks the authority of the login context of the user that performs the processing and determines whether the user is the administrator. This processing in step S711 is executed when the connection setting for the external service A 412 is not configured in step S703 or remote login has been performed by a web browser other than the local web browser (i.e., the web browser of the MFP 110) in step S714 described below. The request processing unit 414 checks the authority of the user stored in the local login context acquired in step S702 or in remote login context acquired in step S715 described below. Then, the request processing unit 414 determines whether the login user is the administrator based on the checked login context. If the user is determined to be the administrator (YES in step S711), the processing proceeds to step S712. If the user is not determined to be the administrator (NO in step S711), the processing proceeds to step S713.

In step S712, the web application 404 generates HTML data of the service setting screen 540. Then, the processing proceeds to step S707, and the generated screen data of the service setting screen 540 is transmitted to the web browser 411 being the requestor.

In step S713, the web application 404 generates HTML data of an error screen (not shown) with respect to the setting for the connection to the external service A or external service B or both of them by authority of the administrator. Then, the processing proceeds to step S707, and the web application 404 transmits the generated screen data of the error screen to the web browser 411.

The processing in step S714 is performed when it is determined that the web application 404 has been accessed by a web browser other than the web browser 403 being a local browser in step S701. In step S714, the web application 404 determines whether the remote logging into the web server has been completed based on the cookie information of the web browser. According to the first exemplary embodiment, this processing corresponds to determination processing of whether the authentication has been performed according to the access from the web browser 411 of the PC 120. In other words, the web application 404 inquires the login user context storage unit 405 and determines whether authentication information corresponding to the session with the web browser 411 exists. If the remote login is determined (YES in step S714), the processing proceeds to step S715. If the remote login is not determined (NO in step S714), the processing proceeds to step S716. Authentication processing for the remote login will be described below.

In step S715, the web application 404 acquires the remote login context of the user who has performed the remote login, and the processing proceeds to step S711. In step S711, the web application 404 determines whether the user is the administrator.

Step S716 is performed when the authentication with respect to access from a remote browser is not performed. In step S716, the web application 404 generates redirection information used for redirection to a URL that indicates a remote access point of the authentication application 401 for the web browser 411. Then, the processing proceeds to step S707. In step S707, the web application 404 transmits the redirection information to the web browser 411 being the requestor.

The above-described flowchart illustrates processing performed by the web application 404 according to a request of the operation screen displayed by the web browser 403 or the web browser 411.

Referring back to FIG. 6, in step S606, when a request is given from the web browser 403 to the web application 404, the web application 404 determines that it has been accessed from a local browser, which corresponds to step S701 in FIG. 7.

In step S607, the web application 404 performs the following processing according to the processing performed in step S702. In other words, the web application 404 acquires information of the login user from the login user context storage unit 405 under such a controlled state that the user authentication processing which is required in using the web application 404 is not performed.

In step S608, the web application 404 performs processing corresponding to step S705. This sequence is based on the assumption that the setting of the external service is already configured. Thus, the processing proceeds from step S703 to step S704. In step S704, since the web application 404 is accessed from the web browser 403 for the first time, there is no session information. Thus, the processing proceeds to step S705. According to the processing in step S705 and based on the user name acquired in step S607, the web application 404 acquires the ID and the password used for the connection to the external service A 412 from the user information storage unit 406. The ID and the password are previously stored in the user information storage unit 406 by the user.

In step S609, the web application 404 transmits the HTML data for the service login screen 520 which has been generated according to the processing performed in steps S705 and S706 to the web browser 403 as a response. At this time, the request processing unit 414 generates session information used for communication with the external service A 412 and transmits the identifier as a cookie to the web browser 403.

Step S610 is performed when the ID and the password input by the user by using the service login screen 520 which is displayed by the web browser 403 is accepted and the use service button 524 is selected. At this time, the web browser transmits the ID and the password entered in the login ID text box 521 and the password input text box 522 to the web application 404 by using the HTTP POST method.

In step S611, based on the received ID and the password, the web application 404 makes a connection to the external service A 412.

Step S612 is performed when the authentication is successful in step S611. In step S612, authentication ticket data is transmitted from the external service A 412 to the web application 404. The authentication ticket data is managed by the web application 404 together with the session information, and used when the external service A 412 is accessed the next time. If the authentication fails, the web application 404 is notified of the error, and the web application 404 transmits the HTML data of the service login screen 520 again to the web browser 403.

In step S613, the web application 404 acquires folder information from the external service A 412 by using the authentication ticket data acquired in step S612.

In step S614, based on the folder information (information related to the service) acquired in step S613, the web application 404 generates HTML data of the external service A operation screen 530 and transmits the generated HTML data to the web browser 403 as a response to step S610. As a result, the external service A operation screen 530 is displayed on the web browser 403. When the web browser 403 accesses the web application 404 the next time, cookie information is transmitted as well. Accordingly, the session in step S704 is determined to be effective, and if the external service A 412 is determined to be connected in step S708, the external service A operation screen 530 is displayed.

The processing performed when the external service A 412 is used from the MFP 110 is as described above. With respect to access from a web browser in an MFP that also includes a web server, repetition of authentication necessary in using the web application can be avoided. Further, information of each user with respect to the external server can be managed.

Although the external service A 412 has been described according to the first exemplary embodiment, the external service B 413 can be processed in a similar manner.

Next, termination of the external service A by the user will be described. First, a case where the user selects the service end button 533 on the external service A operation screen 530 will be described. In this case, first, the web browser 403 notifies the web application 404 that the service end button 533 has been selected by the user by an HTTP POST command. On receiving the command, the web application 404 terminates the connection to the external service A 412. More specifically, the web application 404 notifies the external service A 412 of the disconnection and also deletes the authentication ticket received from the external service A 412. Then, the web application 404 cancels the session with the web browser 403 and transmits the screen data of the service login screen 520 to the web browser. Then, the processing ends.

Next, a case where the user selects the log-out button 517 on the external service A operation screen 530 will be described. If the log-out button 517 is selected, the authentication application 401 deletes the context of the local login user and also notifies each application that the context has deleted. At this time, no notification is given from the web browser 403 to the web application 404. On the other hand, the web application 404 that has received the notification from the authentication application 401 cancels the connection to the external service A 412 based on the information of the local user related to the deleted context. Thus, the web application 404 can disconnect the connection to an external service according to a request given from a local client. Since the web application 404 cancels the connection to an external server that provides a service in synchronization with the log-out processing of the MFP 110, the user does not need to perform the log-out processing twice and will be convenient for the user.

Figure 8:
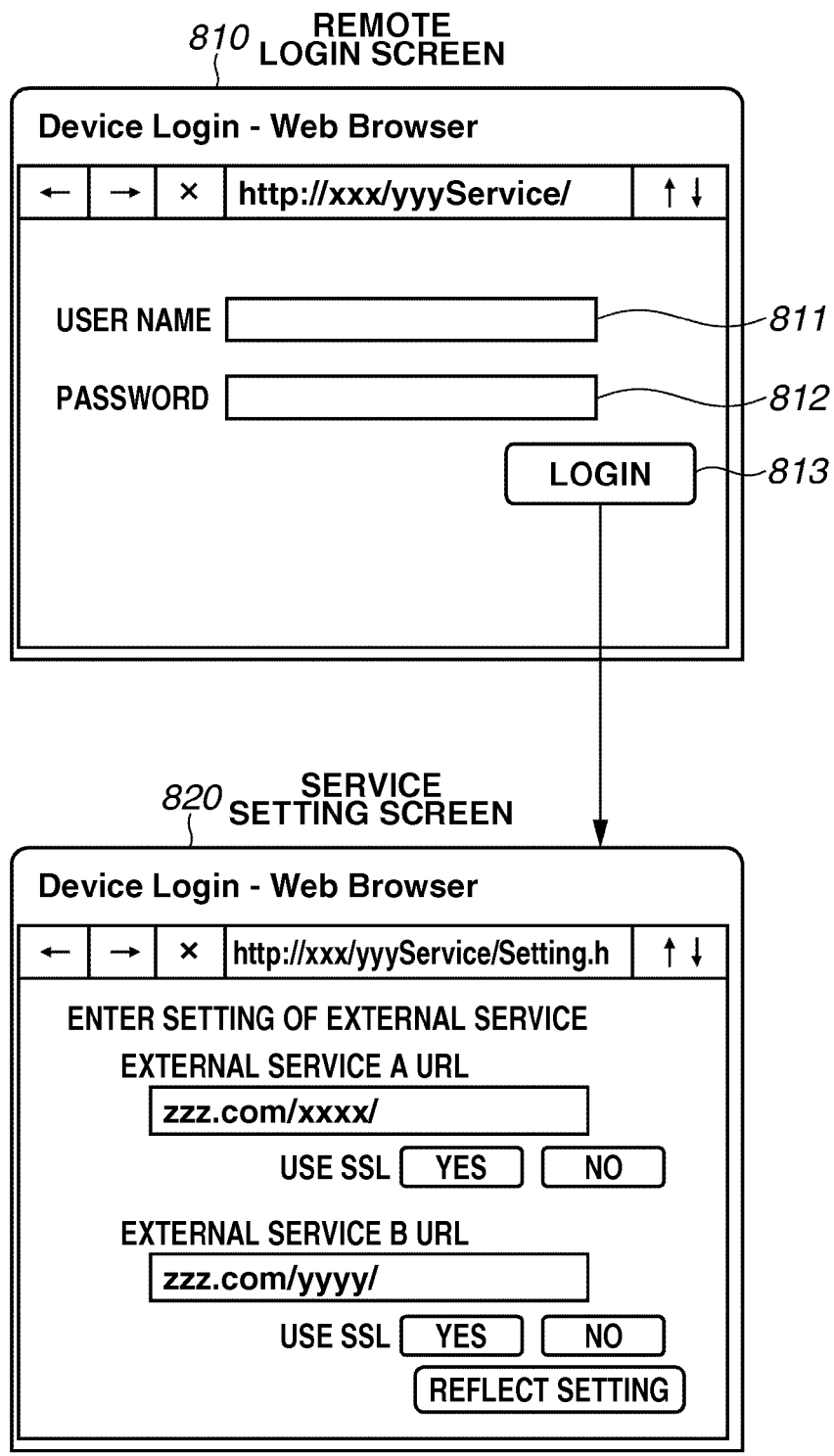
FIG. 8 illustrates the transition of an operation screen displayed by the web browser according to the first exemplary embodiment.

Next, setting of the web application 404 of the MFP 110 from the PC 120 will be described with reference to FIGS. 8 and 9. FIG. 8 illustrates a remote login screen 810 being an operation screen displayed by the web browser 411 of the PC 120.

The remote login screen 810 is a screen for remote login which is displayed when the user accesses the web application 404 using the web browser 411. This screen is displayed as a result of redirection of the web application 404 to the authentication application 401. This processing will be described below. When the user enters the user name in a user name text box 811 and a password in a password input text box 812 and selects a login button 813, the authentication application 401 compares the information that has been input with the user list stored in advance and performs user authentication.

A service setting screen 820 is a screen displayed by the web browser 411 when the user who has performed the remote login to the web application 404 is determined to be the administrator. The content of the display is the same as what is displayed on the service setting screen 540.

Figure 9:
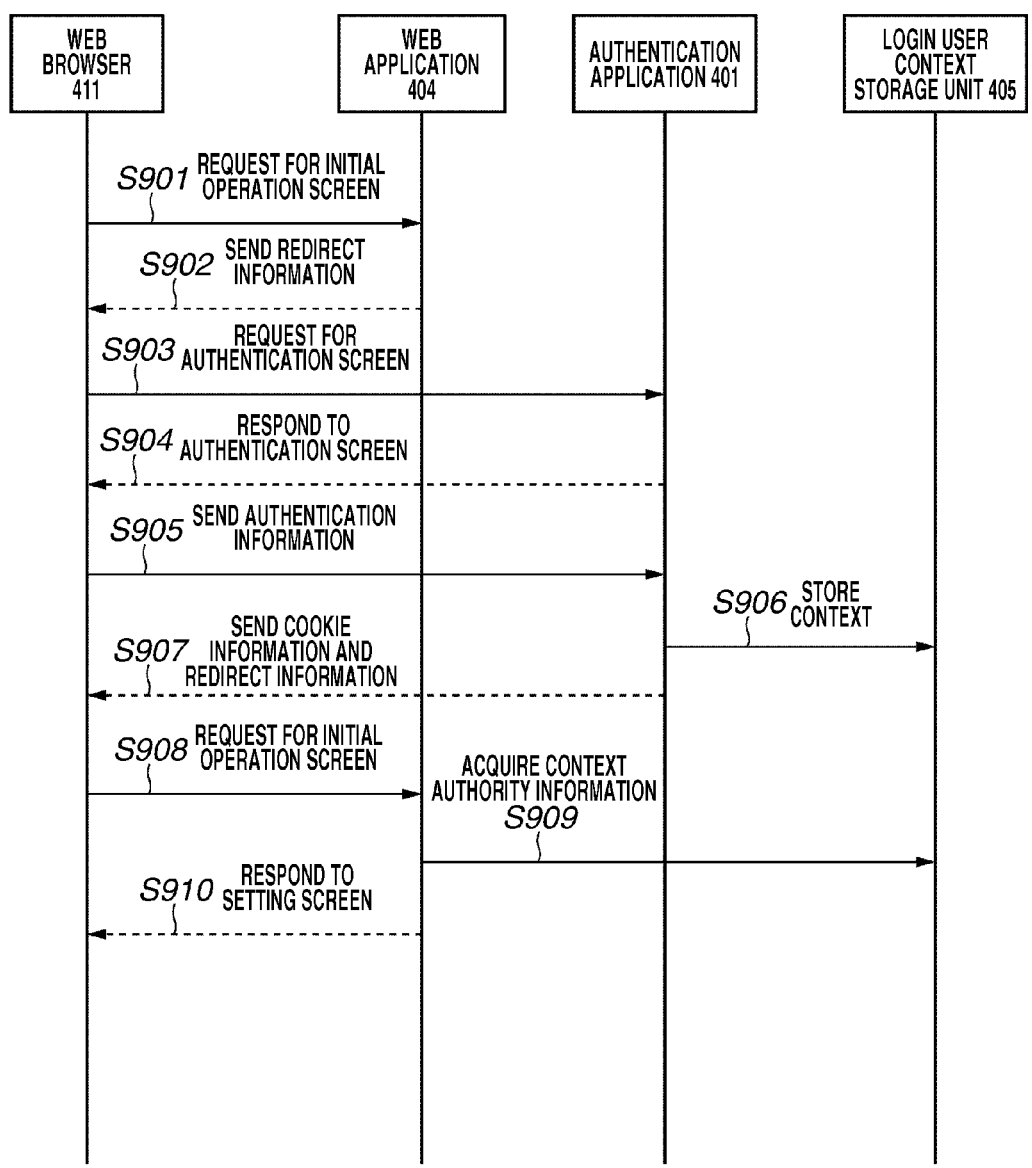
FIG. 9 is a sequence diagram of the connection setting processing of an external service set by the web browser according to the first exemplary embodiment.

FIG. 9 is a sequence diagram illustrating processing performed when the user connects the web browser 411 of the PC 120 to the web application 404.

In step S901, the web browser 411 accepts the URL of the web application 404 input by user and sends out a screen acquisition request to the web application 404. In response to this request, the web application 404 performs the following processing. First, as in step S701, the web application 404 determines that the access is made not from a local browser but from a remote browser. Then, as in step S714, the web application 404 makes such control that the user performs the authentication necessary in using the web application 404 via the web browser 411.

In step S902, according to processing in steps S901, S716, and S707, the web application 404 sends redirection information to the web browser 411 so that the web browser 411 accesses the URL of the authentication application 401.

In step S903, according to the redirection instruction received in step S902, the web browser 411 sends out a request for the remote login screen 810 to the authentication application 401.

In step S904, the authentication application 401 transmits HTML data of the remote login screen 810 to the web browser 411.

In step S905, the web browser 411 accepts the authentication information input by the user and transmits the authentication information to the authentication application 401 by using the HTTP POST command.

In step S906, the authentication application 401 performs authentication based on the authentication information received in step S905. According to the first exemplary embodiment, the following processing is performed based on the assumption that the authentication has been successful. Since the authentication has been successful, the authentication application 401 stores the cookie information of the identifier of the session information and the login context in the login user context storage unit 405 as remote login context.

In step S907, the authentication application 401 transmits two pieces of information being the cookie information of the session and the redirection information to the web application 404 to the web browser 411.

In step S908, the web browser 411 is connected to the web application 404 based on the redirection information. Since the authentication is successful in step S906, the determination regarding login performed in step S714 is completed.

In step S909, the web application 404 acquires the authority information of the remote login context from the login user context storage unit 405 as is performed in step S715.

In step S910, the web application 404 transmits the HTML data of the service setting screen 540 to the web browser 411. According to the first exemplary embodiment, since the administrator is in a login state, the user is determined as the administrator in step S711, and the HTML data of the service setting screen 820 is transmitted to the web browser 411.

The setting of the web application 404 of the MFP 110 is performed by the PC 120 as described above. As described above, if the web application 404 is accessed by a web browser different from the web browser 403 in the MFP 110, remote authentication is performed and processing according to the user can be performed. According to the first exemplary embodiment, if the user that has performed the remote authentication is the administrator, the service setting screen 820 is transmitted to the web browser. On the other hand, if the user is not the administrator, an error screen is transmitted to the web browser.

According to the first exemplary embodiment of the present invention, even if connection is requested from a browser other than the browser of the MFP 110, the web server transmits the setting screen if the authentication is successful. Accordingly, if the administrator needs to change settings of a plurality of MFPs, the administrator does not need to configure settings for each MFP. However, if this function is not requested, all the connection requests given by a browser other than the browser in the MFP 110 may be processed as errors. If an error is determined, the web application 404 can transmit an error screen requesting the user to access from the MFP 110 regarding a request given by a browser other then the MFP 110 to the web browser. In this manner, unauthorized connection to the MFP 110 can be furthermore reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-055997 filed Mar. 12, 2010, which is hereby incorporated by reference herein in its entirety.

What is claimed is:

1. An image forming apparatus comprising:
a web server configured to generate an operation screen;
a browser configured to receive the operation screen from the web server and to display the operation screen;

an authentication unit configured to provide a local login screen and perform authentication of a user who uses the image forming apparatus based on authentication information input via the local login screen;

an identification unit configured to identify, if a connection request is given to the web server, a requestor of the connection request;

a web server authentication unit configured to perform authentication of a user to use the web server; and a control unit configured to, if the requestor is identified as the browser of the image forming apparatus by the identification unit, control the web server to transmit the operation screen to the browser of the image forming apparatus without the web server authentication unit performing the authentication, wherein, if the requestor is identified as a web browser of an external apparatus externally connected to the image forming apparatus, the web server authentication unit provides the external apparatus with a remote login screen and performs the authentication of the user to use the web server based on authentication information input via the remote login screen.

2. The image forming apparatus according to claim 1, wherein the image forming apparatus is capable of communicating with an information processing apparatus including a browser used for displaying an operation screen, and wherein if the requestor is identified as the browser of the information processing apparatus by the identification unit, the control unit, in response to the authentication performed by the web server authentication unit being successful, controls the web server to transmit the operation screen to the browser of the information processing apparatus.

3. The image forming apparatus according to claim 1, wherein the image forming apparatus is capable of communicating with the external apparatus configured to provide a service, and wherein the image forming apparatus further comprises:
an information identification unit configured to identify, in response to authentication performed by the authentication unit being successful, information concerning the user who has been authenticated by the authentication unit and used for connection to the external apparatus;

a reception unit configured to perform authentication of the external apparatus by using the information identified by the information identification unit, and to receive information related to the service from the external apparatus in response to the authentication being successful; and a transmission unit configured to transmit the operation screen generated by the web server based on the information received by the reception unit.

4. The image forming apparatus according to claim 2, wherein if the requestor is identified as the information processing apparatus by the identification unit, the web server generates an operation screen used for setting information necessary in connection to an external apparatus to allow the image forming apparatus to use a service provided by the external apparatus, and transmits the generated operation screen to the information processing apparatus.

5. A method for controlling an image forming apparatus, the method comprising:
generating an operation screen;
receiving the operation screen from the generating step and displaying the operation screen;
providing a local login screen and performing authentication of a user who uses the image forming apparatus based on authentication information input via the local login screen;
identifying, if a connection request is given to the web server, a requestor of the connection request;
performing authentication of a user to use the web server; and
controlling, if the requestor is identified as the browser of the image forming apparatus, the web server to transmit the operation screen to the browser of the image forming apparatus without performing the authentication,
wherein, if the requestor is identified as a web browser of an external apparatus externally connected to the image forming apparatus, the performing authentification step provides the external apparatus with a remote login screen and performs the authentication of the user to use the web server based on authentication information input via the remote login screen.

6. A computer-readable storage medium storing computer-executable instructions for causing a computer to execute a method for controlling an image forming apparatus, the method comprising:
generating an operation screen;
receiving the operation screen from the generating step and displaying the operation screen;
providing a local login screen and performing authentication of a user who uses the image forming apparatus based on authentication information input via the local login screen;
identifying, if a connection request is given to the web server, a requestor of the connection request;
performing authentication of a user to use the web server; and
controlling, if the requestor is identified as the browser of the image forming apparatus, the web server to transmit the operation screen to the browser of the image forming apparatus without performing the authentication,
wherein, if the requestor is identified as a web browser of an external apparatus externally connected to the image forming apparatus, the performing authentification step provides the external apparatus with a remote login screen and performs the authentication of the user to use the web server based on authentication information input via the remote login screen.

* * * * *